United States Patent [19]

Malmendier

[11] Patent Number: 4,749,007
[45] Date of Patent: * Jun. 7, 1988

[54] METHOD FOR MANUFACTURING CLOTH PARTICULARLY FOR PAPER-MANUFACTURING MACHINE

[75] Inventor: Joseph Malmendier, Eupen, Belgium

[73] Assignee: Asten Group, Inc., Charleston, S.C.

[*] Notice: The portion of the term of this patent subsequent to Nov. 11, 2003 has been disclaimed.

[21] Appl. No.: 929,596

[22] Filed: Nov. 10, 1986

Related U.S. Application Data

[63] Continuation of Ser. No. 705,742, Feb. 26, 1985, Pat. No. 4,621,663.

[30] Foreign Application Priority Data

Feb. 29, 1984 [FR] France ................ 84 03144

[51] Int. Cl.$^4$ ............................................. D03D 23/00
[52] U.S. Cl. ............................. 139/383 A; 139/408; 139/410; 139/411; 139/425 A
[58] Field of Search .......... 139/383 A, 383 R, 425 A, 139/408, 409, 410, 411

[56] References Cited

U.S. PATENT DOCUMENTS

| | | | |
|---|---|---|---|
| 2,269,869 | 1/1942 | Specht | 139/425 |
| 2,316,818 | 4/1943 | Stybr | 139/425 |
| 2,854,032 | 9/1958 | Santos | 139/383 A |
| 4,057,083 | 11/1977 | Juillard et al. | 139/20 |
| 4,290,209 | 9/1981 | Buchanan et al. | 34/123 |
| 4,501,303 | 2/1985 | Osterberg | 139/383 A X |
| 4,515,853 | 5/1985 | Borel | 428/257 |
| 4,554,953 | 11/1985 | Borel et al. | 139/383 A |
| 4,565,051 | 1/1986 | Odenthal | 139/383 A X |
| 4,569,375 | 2/1986 | Borel | 139/383 A |

FOREIGN PATENT DOCUMENTS

| | | |
|---|---|---|
| 0036527 | 9/1981 | European Pat. Off. . |
| 0097966 | 6/1983 | European Pat. Off. . |
| 731243 | 2/1943 | Fed. Rep. of Germany ... 139/383 A |
| 3224187 | 12/1983 | Fed. Rep. of Germany ... 139/383 A |
| 2407291 | 10/1978 | France . |

Primary Examiner—Stephen Marcus
Assistant Examiner—T. Graveline
Attorney, Agent, or Firm—Volpe and Koenig

[57] ABSTRACT

There is described a cloth for draining and drying paper webs, comprising a fabric formed by warp threads and weft threads. Said cloth further comprises a top layer of interlaced lengthwise strips and weft threads, at least one upper weft thread part passing underneath one or a plurality of lengthwise strips, being connected to the fabric by at least one warp thread thereof, which has been passed between said upper weft thread part and the lengthwise strip or strips.

8 Claims, 2 Drawing Sheets

METHOD FOR MANUFACTURING CLOTH PARTICULARLY FOR PAPER-MANUFACTURING MACHINE

This is a continuation of application Ser. No. 705,742, filed Feb. 26, 1985, now U.S. Pat. No. 4,621,663.

The invention relates to a cloth, particularly to a fabric or felt for draining and drying paper webs in paper-manufacturing machines, comprising warp threads and weft threads which are woven together to form a fabric with a single layer or multiple layers, as well as to the method for preparing such a cloth.

Cloths for drying paper webs in paper-manufacturing machines have been known for a long time. The moist paper web is caused to move over drying drums, on which said web is passed by means of a drying cloth. Examples of drying cloths having warp threads and weft threads so woven together as to form a single-layer or multi-layer fabric have been disclosed for example in W. KUFFERATH, Bindungssysteme von Papiermaschinensieben, Wochenblatt für Papierfabrikation 5, 1982, pp.139 to 152.

A substantial problem with the drying cloths lies in providing a pressing surface to be laid over the paper web which is as large and as smooth as possible, to improve the drying conditions of the paper web, and avoiding the cloth leaving traces printed in the dried paper web.

It has been tried to solve such problems by utilizing in the weaving of cloth, warp threads with a cross-section which is not round, but to the contrary rectangular (see for instance U.S. Pat. No. 4,290,209, published European Application No. 81 101584.1, or the cloth under Trademark PLANET, sold by the German Company Thomas Joseph Heimbach GmbH & Co). Such cloths, even if they have an enlarged contact area relative to the usual cloths, do not solve completely satisfactorily the raised problems.

To solve said problems, there is provided according to the invention, a cloth as described hereinabove, which further comprises a top layer which is formed by interlaced lengthwise strips and top weft threads, and at least part of the top weft thread passing underneath one or a plurality of lengthwise strips is connected to said fabric by at least one warp thread thereof, which is passed between said top weft thread part and the lengthwise thread or threads.

In an advantageous embodiment of the invention, the lengthwise threads are arranged side by side, so as to cover substantially completely the fabric surface area.

In a preferred embodiment of the invention, the top weft threads are of flattened shape, preferably with a rectangular cross-section.

There is provided according to the invention, a method for preparing a cloth of this kind, said method comprising forming a single-layer- or multi-layer fabric by weaving warp threads and weft threads, which method comprises the steps of forming simultaneously above said fabric, a top layer by interlacing lengthwise strips and top weft threads, and during each top thread inserting, passing underneath same at least one warp thread from said fabric.

Other details and features of the invention will stand out from the following description, given by way of non limitative example and with reference to the accompanying drawings, in which.

Figure 2:
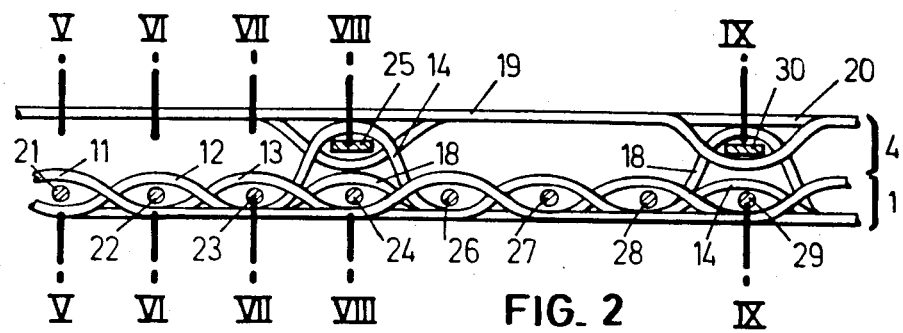
FIGS. 2 to 4 show lengthwise sections of various embodiments of the cloth according to the invention, FIG. 4 showing in section the embodiment as shown in FIG. 1.

FIGS. 5 to 7, and 8a, 8, 9a and 9 show cross-sections along lines V—V, VI—VI, VII—VII, VIII—VIII, and IX—IX respectively in FIG. 2.

In the various figures, identical or similar elements are designated by the same reference numerals in the various figures.

Figure 1:
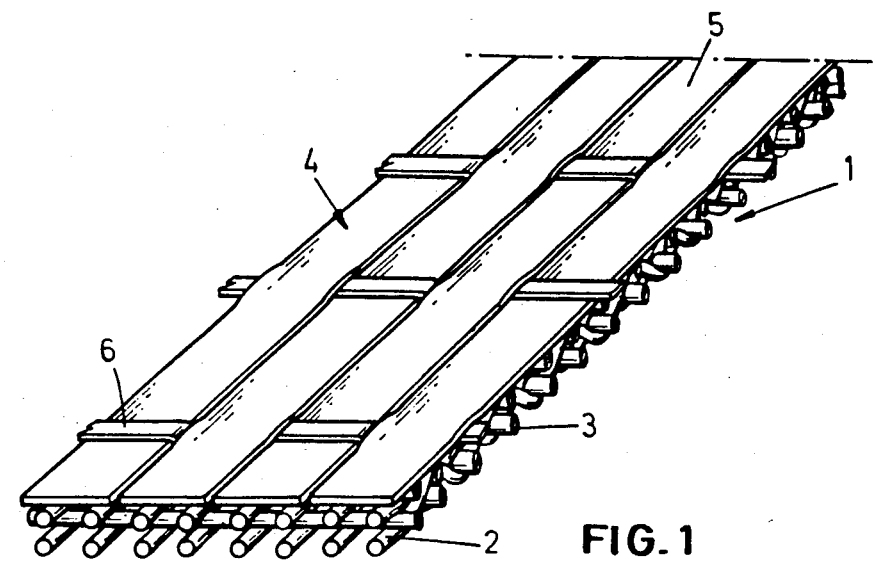
FIG. 1 is a perspective view of a cloth portion according to the invention.
Figure 4:
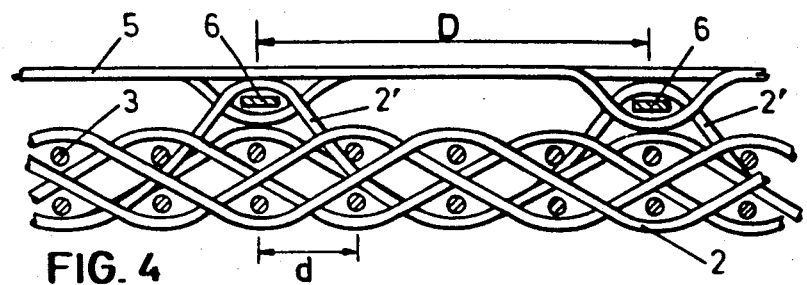
Figure 5:
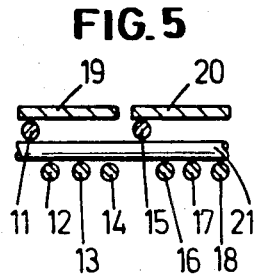
Figure 6:
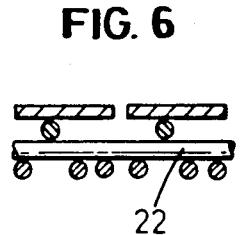
Figure 7:
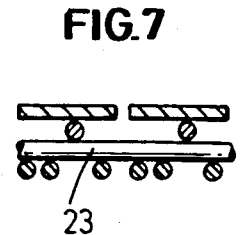

The cloth as shown in FIGS. 1 and 4, comprises a fabric 1 formed by warp threads 2 and weft threads 3 which are interlaced by weaving. Said threads are formed from materials having properties and parameters which are conventional for cloths intended for drying paper webs as would be known to a person of ordinary skill in the art.

Said cloth further comprises a top layer 4 formed by lengthwise strips 5 and weft threads or strips 6, which are called here top weft threads.

In the embodiment as shown in FIGS. 1 and 4, the lengthwise warp strips are arranged side by side in such a way as to cover substantially completely the surface area of fabric 1. The spacing D between the top weft threads 6 is larger than the spacing d between the lower weft threads 3 of fabric 1. Each top weft thread 6 alternately passes over and underneath succeeding lengthwise strips 5.

Each part of top weft thread 6 which passes underneath a lengthwise strip 5, simultaneously passes underneath one warp thread 2' from fabric 1, said warp threads being shown in FIG. 4. Said lower warp threads are the ones which retain the top layer 4 connected to said double fabric 1.

The lengthwise strips 5 are made from any suitable material for drying cloths, as known to a person of ordinary skill in the art. It is notably possible to use a thermoplastic material. The width of the strips is not critical, but it is preferred to have said width at least equal to the sum of the thickness of two adjacent lower warp threads and the mutual spacing thereof. Said strips may for example have a width of about 2.5 mm and a thickness of about 0.1 mm.

The top weft threads 6 in the example as shown in FIGS. 1 and 4, are different from the weft threads 3 of the double fabric 1. They may however be identical in nature or shape, and they may thus also have a round cross-section. It is however preferred to use top weft threads with a flattened cross-section, for example a rectangular one.

Figure 3:
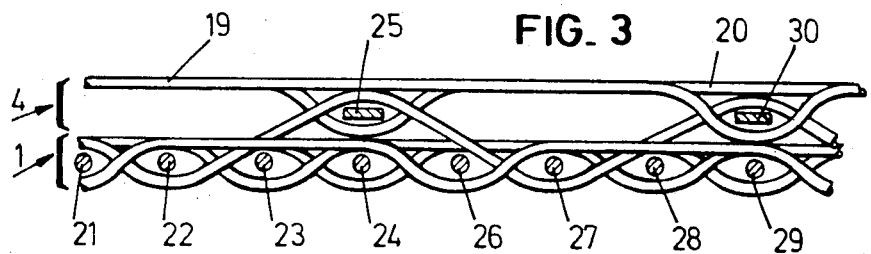

In FIGS. 2 and 3 have been shown in lengthwise section, two other embodiments of cloth according to the invention. Said embodiments differ from the one as shown in FIG. 1 due to the supporting fabric 1 being a single-layer fabric and not a double fabric any more.

For the clearness of the description, reference will be made to FIGS. 5 to 7, and 8a, 8, 9a, and 9 to explain the method for preparing a cloth according to the invention, said figures being cross-section views of the cloth as shown in FIG. 2, after inserting each succeeding upper weft thread. It appears from said figures that the supporting fabric 1 is formed by weaving lower warp threads, eight of which are shown here (threads 11 to 18), which are moved between high and low positions with determined rates to form a shed, which will be called hereinafter the lower shed. Four adjacent lower warp threads are covered by a single lengthwise strip, and thus but two lengthwise strips 19 and 20 have been shown. They form a top warp covering the supporting fabric 1.

Figure 8A:
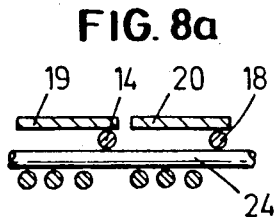
Figure 8:
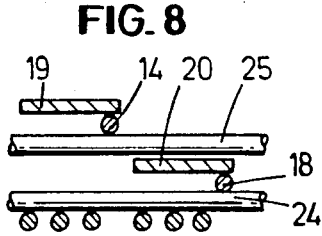

During four succeeding steps, a lower weft thread 21, 22, 23 and 24 respectively, is passed through the lower shed, as it appears from FIGS. 5 to 8a, and the lengthwise strips 19 and 20 are retained at the same level. FIG. 8a is illustrative of a section view along line VIII—VIII in FIG. 2, of an instant in the weaving process after bringing the lower weft thread 24 in, but before bringing the upper weft thread 25 in. During the following weaving step as shown in FIG. 8, the warps are not fed on, the lengthwise strips 19 and 20 are so moved as to form a shed, called hereinafter the upper shed, and among the two warp threads 14 and 18 passing over the lower weft thread 24, but warp thread 14 is brought to a raised high position, as shown in said FIG. 8, that is directly underneath the lengthwise strip 19 lying in its high position. An upper weft thread 25 is then passed through the thus-formed upper shed, by passing thus underneath the warp thread 14 from the supporting fabric 1, but along a path lying in a plane higher than the one followed by the weft threads 21 to 24.

Figure 9A:
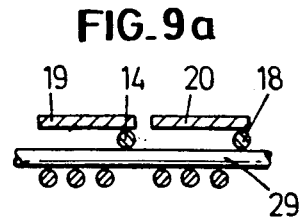
Figure 9:
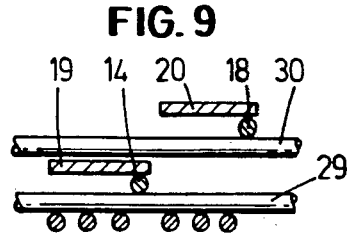

After closing the upper shed by bringing closer the lengthwise strips 19 and 20, the four following steps are indentical with the ones as shown in FIGS. 5 to 8a. It is indeed clear that the mutual position of the threads and strips, in the fourth step from said following weaving steps, shown in FIG. 9a, is identical with the showing in FIG. 8a. FIG. 9a is illustrative of a cross-section view along line IX—IX in FIG. 2, of an instant in the weaving process after bringing the lower weft thread 29 in, but before bringing the upper weft thread 30 in. During the following weaving step, as shown in FIG. 9, the warps are stopped again, the lengthwise strips 19 and 20 are spread in the opposite directions to the position thereof as shown in FIG. 8b, and the warp thread 18 only is moved to a raised position. A weft thread 30 is passed through the thus-formed upper shed, by passing thus underneath the warp thread 18 from the supporting fabric 1, in the same plane as weft thread 25.

The embodiment as shown in FIG. 3 is very similar to the one as shown in FIG. 2, and only the passage order between the mutual high and low positions of the warp threads are different.

As it appears from FIGS. 2 and 3, the upper weft threads 25 and 30 advantageously have a rectangular cross-section. This has the advantage of minimizing the contact area loss in the few spaced locations where the lengthwise strips pass underneath the upper weft threads.

The cloths according to the invention have relative to the known cloths, the substantial advantage of a marked increase in the possible contact area between the cloth and the paper web. Indeed, the presence of a top layer comprised of wide strips lying side by side, and interlaced only with upper weft threads pertaining to said layer, which have preferably also a flattened cross-section, and this in relatively widely-spaced intervals, insures a smooth contact area with contact area never obtained before. On the other hand, the connection formed by warp threads from the underlying fabric, between said underlying fabric and the upper weft threads, insures for said cloth a mechanical strength and a high capacity for pressing the paper web on the drying drums, without simultaneously changing the contact area obtained with the top layer, and the smooth shape thereof.

It must be understood that the invention is in no way limited to the above embodiments and that many changes may be brought thereto without departing from the scope of the invention as defined by the appended claims.

It is possible to use for the supporting fabric, for example, as weft and warp threads, any type of thread usually used in drying cloths, and notably yarns, multifilaments, monofilaments, mineral-fiber threads, or coated threads.

The material or materials used for manufacturing the supporting fabric threads, or the top layer threads and strips may be selected among those materials which are usually used for drying cloths, some of which may notably be found in the previous publications as mentioned in the preamble to this specification.

I claim:

1. An improved method of producing a papermakers fabric of the type having at least two adjacent plies, each ply produced by interweaving respective systems of warp and weft yarns, with said plies united by interweaving selected yarns of the respective systems, the improvement comprising:

producing said upper system with one set of yarns comprised of strips which are interwoven to substantially define the paper contact surface of the fabric, each of said interwoven strips having a width to thickness ratio of at least 5:1 with the width of said strip being equal to at least the width occupied by two yarns of the adjacent ply directly beneath said strip.

2. The method of claim 1 wherein said ratio is at least 10:1.

3. The method of claim 1 wherein said ratio is at least 15:1.

4. The method of claim 1 wherein said ratio is at least 20:1.

5. The method of claim 1 wherein said ratio is at least 25:1.

6. The method of claim 1 wherein said strips are woven to run in the lengthwise direction of the fabric.

7. An improved method of producing a papermakers fabric of a type having at least two adjacent plies, each ply produced by interweaving respective systems of warp and weft yarns, with said plies united by interweaving selected yarns of the respective systems, the improvement comprising:

producing an upper system with one set of yarns comprised of strips which are interwoven to substantially define the paper contact surface of the fabric, each of said interwoven strips having a width about equal to the sum of the thickness of the two adjacent warp threads and a mutual spacing there between of the adjacent ply directly beneath said strips.

8. The method of claim 7, wherein the width to thickness ratio of said interwoven strips is about 5:1.

* * * * *

UNITED STATES PATENT AND TRADEMARK OFFICE
CERTIFICATE OF CORRECTION

PATENT NO. : 4,749,007

DATED : June 7, 1988

INVENTOR(S) : Joseph Malmendier

It is certified that error appears in the above-identified patent and that said Letters Patent is hereby corrected as shown below:

Column 3, line 40, before the word "passed" insert --then--.

Claim 7, column 4, line 60, "there between" should read --therebetween--.

Signed and Sealed this

Twentieth Day of December, 1988

Attest:

DONALD J. QUIGG

Attesting Officer      Commissioner of Patents and Trademarks